(12) United States Patent
Gadgil et al.

(10) Patent No.: US 10,936,454 B2
(45) Date of Patent: Mar. 2, 2021

(54) DISASTER RECOVERY FOR VIRTUALIZED SYSTEMS

(71) Applicant: International Business Machines Corporation, Armonk, NY (US)

(72) Inventors: Hemanand S. Gadgil, Pune (IN); Sanjay K. Sudam, Pune (IN); Kushal Patel, Pune (IN); Sarvesh Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 16/197,707

(22) Filed: Nov. 21, 2018

(65) Prior Publication Data
US 2020/0159634 A1    May 21, 2020

(51) Int. Cl.
   *G06F 11/30* (2006.01)
   *G06F 11/20* (2006.01)
   *G06F 3/06* (2006.01)

(52) U.S. Cl.
   CPC .......... *G06F 11/2094* (2013.01); *G06F 3/064* (2013.01); *G06F 3/067* (2013.01); *G06F 3/0619* (2013.01); *G06F 3/0644* (2013.01); *G06F 3/0653* (2013.01); *G06F 3/0664* (2013.01); *G06F 2201/805* (2013.01); *G06F 2201/815* (2013.01); *G06F 2201/82* (2013.01)

(58) Field of Classification Search
   CPC .................................................. G06F 11/2094
   USPC .......................................................... 714/6.3
   See application file for complete search history.

(56) References Cited

U.S. PATENT DOCUMENTS

| | | | |
|---|---|---|---|
| 7,039,754 B2 | 5/2006 | Sasaki | |
| 7,472,251 B2 | 12/2008 | Sasaki | |
| 8,356,292 B2 | 1/2013 | Hung | |
| 9,020,895 B1 | 4/2015 | Rajashekar | |
| 9,207,874 B2 | 12/2015 | Jennas, II | |
| 9,330,108 B2 | 5/2016 | Jones | |

(Continued)

FOREIGN PATENT DOCUMENTS

CN    102460393 A    5/2012

OTHER PUBLICATIONS

"IBM Spectrum Virtualize for Public Cloud overview", IBM Knowledge Center, Version 8.1.1, Mar. 3, 2018, © Copyright 2017, Last updated: May 29, 2018, 3 pages,<https://www.ibm.com/support/knowledgecenter/en/STHLEK_8.1.1/spectrum.virtualize.cloud.811.doc/svcl_svclicoverview.html>.

(Continued)

*Primary Examiner* — Chae M Ko
(74) *Attorney, Agent, or Firm* — Isaac J. Gooshaw; William H. Hartwell

(57) ABSTRACT

Disaster recovery for a storage system is provided. A data record is generated for a primary computing system that identifies a secondary computing system and indicates a first storage device that includes block storage and a second storage device that includes object storage. The primary computing system experiences either a migration or a failover. Storage space is provisioned in block storage and object storage. Data records from the primary computing device are respectively stored in either the block storage or the object storage based on their respective access rates. Data records that are stored as block storage entries are predicted to have a higher access rates than data records that are stored as object storage entries.

20 Claims, 7 Drawing Sheets

(56) References Cited

U.S. PATENT DOCUMENTS

| | | | |
|---|---|---|---|
| 2010/0100757 A1* | 4/2010 | Takada | G06F 12/0868 |
| | | | 713/340 |
| 2012/0136960 A1 | 5/2012 | Liu | |
| 2012/0311157 A1 | 12/2012 | Erickson | |
| 2013/0036272 A1 | 2/2013 | Nelson | |
| 2014/0115182 A1 | 4/2014 | Sabaa | |
| 2018/0011766 A1 | 1/2018 | Lee | |
| 2019/0057090 A1* | 2/2019 | Xie | G06F 16/13 |
| 2020/0036787 A1* | 1/2020 | Gupta | G06F 3/067 |

OTHER PUBLICATIONS

Holloway, Talor, "How to configure your SAN for Global Mirror using FCoIP with Brocade Multiprotocol Devices", IBM Community, Aug. 28, 2012, 7 pages, <https://www.ibm.com/developerworks/community/blogs/talor/entry/how_to_configure_global_mirror_using_fcoip_with_brocade_multiprotocol_devices?lang=en>.

Mell et al., "The NIST Definition of Cloud Computing", US. Department of Commerce, Special Publication 800-145, Sep. 2011, Gaithersburg, MD, 7 pages.

* cited by examiner

DISASTER RECOVERY FOR VIRTUALIZED SYSTEMS

BACKGROUND OF THE INVENTION

The present invention relates generally to the field of software defined networking, and more particularly to disaster recovery in a software defined network.

Information technology (IT) resources, such as computer processors and networks, are being called upon to support ever greater processing demands, leading to the need for guidelines for network disaster recovery. Virtualization provides a way to abstract the components of today's IT resources to consolidate, integrate, and simplify the required infrastructure and reduce the overall cost of IT resource ownership.

SUMMARY

Embodiments of the present invention provide a method to dynamically provision block storage space during a failover of a primary storage structure.

A first embodiment encompasses a method for disaster recovery protocol for a virtual storage system. One or more processors generate a set of data that describes respective access rates of cache entries of a primary virtual storage system. The one or more processors generate a data record that is associated with a secondary virtual storage system and indicates (i) a first storage device that includes block storage and (ii) a second storage device that includes object storage. Responsive to either (i) a failover of the primary virtual storage system or (ii) a migration request for the second virtual storage system, one or more processors populate the first storage device and the second storage device based, at least in part, on respective rates of access of the cache entries of the primary virtual storage system, wherein data stored as block storage entries in the first storage device are predicted to have a higher rate of access when compared to the predicted rates of access for data stored as object storage entries in the second storage device.

A second embodiment encompasses a computer program product for disaster recovery protocol of a virtual storage system. The computer program product includes one or more computer-readable storage media and program instructions stored on the one or more computer-readable storage media. The program instructions include program instructions to generate a set of data that describes respective access rates of cache entries of a primary virtual storage system. The program instructions include program instructions to generate a data record that is associated with a secondary virtual storage system and indicates (i) a first storage device that includes block storage and (ii) a second storage device that includes object storage. Responsive to either (i) a failover of the primary virtual storage system or (ii) a migration request for the second virtual storage system, the program instructions include program instructions to populate the first storage device and the second storage device based, at least in part, on respective rates of access of the cache entries of the primary virtual storage system, wherein data stored as block storage entries in the first storage device are predicted to have a higher rate of access when compared to the predicted rates of access for data stored as object storage entries in the second storage device.

A third embodiment encompasses a computer system for disaster recovery protocol for a virtual storage system. The computer system includes one or more computer processors, one or more computer readable storage medium, and program instructions stored on the computer readable storage medium for execution by at least one of the one or more processors. The program instructions include program instructions to generate a set of data that describes respective access rates of cache entries of a primary virtual storage system. The program instructions include program instructions to generate a data record that is associated with a secondary virtual storage system and indicates (i) a first storage device that includes block storage and (ii) a second storage device that includes object storage. Responsive to either (i) a failover of the primary virtual storage system or (ii) a migration request for the second virtual storage system, the program instructions include program instructions to populate the first storage device and the second storage device based, at least in part, on respective rates of access of the cache entries of the primary virtual storage system, wherein data stored as block storage entries in the first storage device are predicted to have a higher rate of access when compared to the predicted rates of access for data stored as object storage entries in the second storage device.

DETAILED DESCRIPTION

Figure 1:
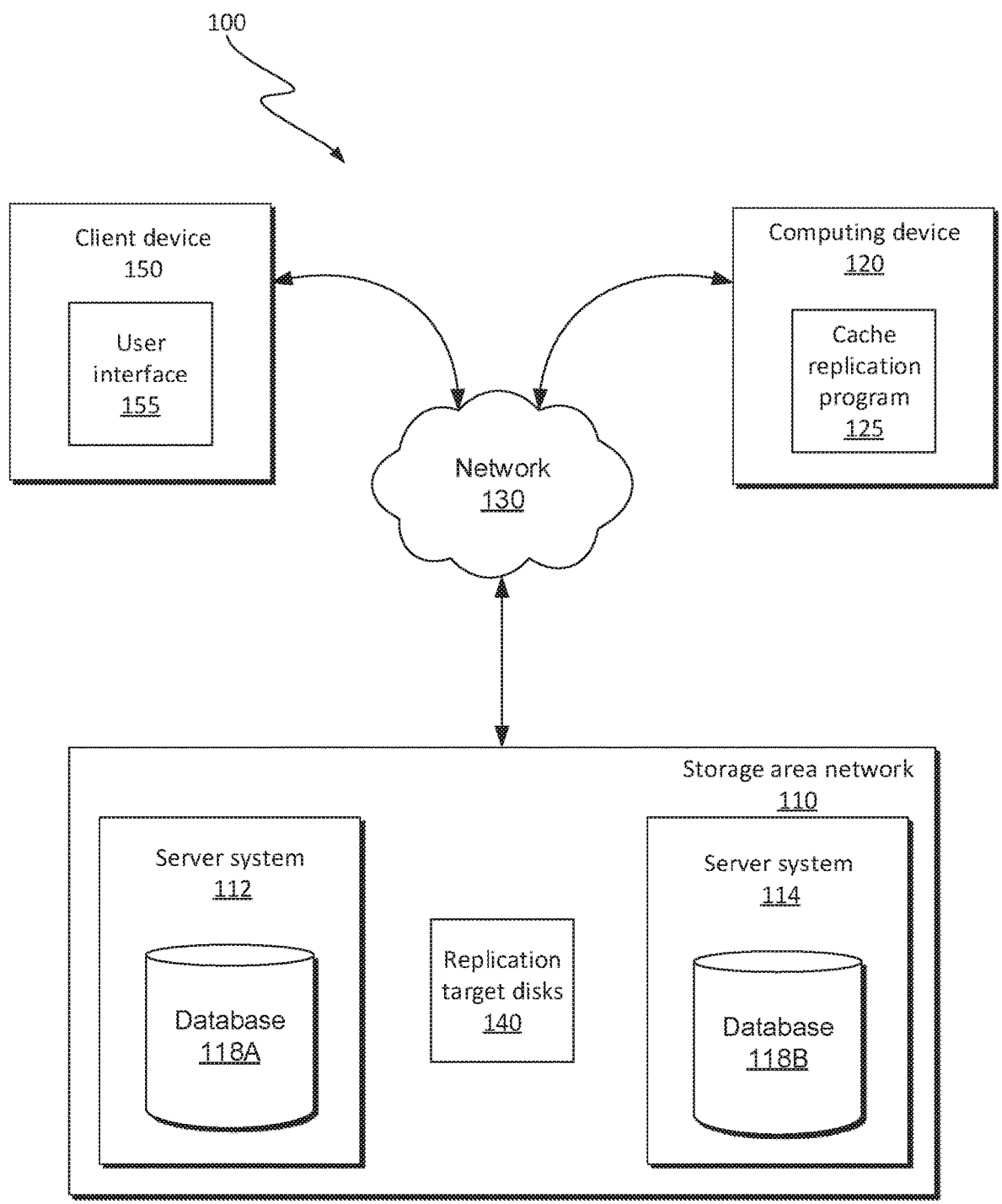
FIG. 1 is a functional block diagram illustrating a software defined network environment, in which a disaster recovery protocol is triggered computing device communicates with various computing devices across a network, in accordance with at least one embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In some solutions to disaster recovery in a software defined network (SDN), a determination is made as to whether the data should be replicated. As such, these disaster recovery solutions do not proactively analyze data from a primary storage cluster and dynamically provision data storage on a secondary storage cluster. Embodiments of the present invention provide solutions to disaster recovery in a SDN by (i) replicating data from a primary storage cluster to a secondary storage cluster and (ii) dynamically provisioning storage space and transferring data from an expensive, cumbersome storage capacity to a more inexpensive and efficient storage capacity. Additionally, the present invention provides for the utilization of a data record (i.e., heat map) while data is replicated from a primary storage cluster to a secondary storage cluster.

Embodiments of the present invention recognize that disaster recovery involves a set of policies, tools and procedures to enable the recovery or continuation of vital technology infrastructure and systems following a natural or human-induced disaster. Some solutions to disaster recovery in a SDN preserve data and information by having a remote disaster recovery location that replicates data through specified intervals. However, such systems may, in certain circumstances, be ineffective and expensive to maintain compared to other solutions. The present invention provides a more effective and affordable system for disaster recovery in a SDN when compared to certain other solutions for disaster recovery in a SDN.

Embodiments of the present invention provide (i) detection of a network failure of a primary storage cluster and initiates disaster recovery (DR) protocol and (ii) dynamic provisioning of network block storage capacity for data being transferred from the primary storage cluster. Embodiments of the present invention provide a concrete solution that addresses at least the challenge of cache management during one or both of failover and migration scenarios. In general, embodiments may provide reduced latency by populating certain types of types of data storage media with certain types of data based on a probability that a client application will require access to that data. As such, the embodiments described herein provide a solution to a problem arising in computer systems and encompass an improvement to those computing systems overall. Additionally, certain embodiments of the present invention include application program interface(s) (API) that enable communication with network providers to further allocate additional block storage by indexing a block-based heat map utilizing relative objects.

Server virtualization technology allows for the configuration and deployment of multiple logical server configurations on a common physical footprint to provide processing and usage benefits beyond those of the physical configuration. The physical server's resources are abstracted to accommodate the concurrent deployment of multiple instances of virtual processors. Each virtual instance, called a virtual machine (VM), is capable of operating a separate operating system (OS) instance and its associated software stacks as if each instance was deployed on a separate physical server. This virtual view offers the benefit of not being restricted by the implementation or configuration of the underlying physical server resources. Each virtual processor instance provides a subset or superset of the various physical server resources that may be dedicated or concurrently shared by multiple VM abstractions. By using processor virtualization technologies, the system's processors can be transparently multi-programmed and multi-processed by a virtualization hypervisor to optimize processor sharing by multiple VM instances, thereby increasing processor utilization.

In traditional IT network architectures there is no centralized network control. Routing tables located locally in network devices, such as switches, bridges, gateways, routers, or firewalls, are individually configured to direct network traffic to neighboring nodes of the network. The network devices may make control decisions and forward network traffic accordingly. Traditional network architectures are contrasted with software-defined networking (SDN), where network traffic routing decisions are centrally controlled and made by a controller that creates tables to define flow paths through the network. The controller decouples control decisions about where traffic is sent from network devices that forward traffic to a selected destination.

In one embodiment, disaster recovery protocol for a virtual storage system is provided. In one embodiment, a set of data is generated that describes respective access rates of cache entries of a primary virtual storage system. A data record is generated that is associated with a secondary virtual storage system and indicates (i) a first storage device that includes block storage and (ii) a second storage device that includes object storage. Responsive to either (i) a failover of the primary virtual storage system or (ii) a migration request for the primary virtual storage system, the first storage device and the second storage device are populated based, at least in part, on respective rates of access of the cache entries of the primary virtual storage system, wherein data stored as block storage entries in the first storage device are predicted to have a higher rate of access when compared to predicted rates of access for data stored as object storage entries in the second storage device.

In one embodiment, a first data partition is generated in the first storage device that includes a set of block data records that correspond to data entries stored in the cache entries of the primary virtual storage system that are predicted to have at least a threshold rate of access. In one embodiment, a second data partition is generated in the second storage device that includes a set of object data records that correspond to a data stored in the cache entries of the primary virtual storage system that are predicted to have less than the threshold rate of access.

In one embodiment, a data is generated that (i) is associated with a primary virtual storage system and a secondary virtual storage system, and (ii) includes a data record. In one embodiment, the data is stored as (i) a first data partition that includes the data record, identifying, at least, a first object data associated with the data in the first storage device and (ii) a second data partition that includes the data record, identifying, at least, a second object data associated with the data in the second storage device.

In one embodiment, a determination that a failover of the primary virtual storage system has occurred is based on a determination that the secondary virtual storage system has received receipt of the failover from a cache replication program.

In one embodiment, responsive to a failover of the primary virtual storage system, the secondary virtual storage system is assigned to provision storage capacity to a target disk associated with (i) the first storage device of the block storage and (ii) the secondary virtual storage system.

In one embodiment, conversion of a data is executed based, at least, on (i) the first data partition and (ii) the data record. In one embodiment, the data is stored based, at least, on the (i) the first data partition and (ii) the data record.

In one embodiment, transfer of (i) a first data partition and (ii) a second data partition is authorized based on receipt of a reconstructed primary virtual storage system. In one embodiment, authorization is determined for a deprovisioning of a target disk associated with (i) the cache of the block storage and (ii) the secondary virtual storage system.

In one embodiment, a first data is determined that is (i) associated with a replication and (ii) a data record, and a second data that is (i) associated with a host and (ii) a data record. In one embodiment, the first data is stored as a data object based, at least, on the (i) the second storage device and the (ii) data record. In one embodiment, the second data as a data block is stored based, at least, on the (i) the first storage device and (ii) the data record.

The present invention will now be described in detail with reference to the Figures.

FIG. 1 is a functional block diagram illustrating a software defined network (SDN) environment, generally designated 100, in accordance with one embodiment of the present invention. SDN environment 100 includes storage area network 110, which comprises server systems 112 server system 114, and replication target disks 140, computing device 120, and client device 150 connected over network 130. Storage area network 110 includes server system 112, server system 114, and replication target disks 140. Server system 112 is comprised of database 118A, and server system 114 is comprised of database 118B.

Storage area network (SAN) 110 is a storage system that includes server system 112, server system 114 and replication target disks 114. SAN 110 may include one or more, but is not limited to, computing devices, servers, server-cluster, web-servers, database and storage devices. SAN 110 operates to communicate with computing device 120 and client device 150 over a network, such as network 130. For example, SAN 110 communicates with cache replication program 125 to transfer data between, but is not limited to, a first database, i.e., database 118A, and a second database, i.e. database 118B. The present invention recognizes that FIG. 1 may include (not shown) any number of computing devices, servers, databases and/or storage devices, and the present invention is not limited to what is depicted in FIG. 1.

In various embodiments of the present invention, server system 112 and server system 114 is a computing device that can be a standalone device, a server, a web server, a laptop computer, a tablet computer, a netbook computer, a personal computer (PC), or a desktop computer. In another embodiment, server system 112 and server system 114 represents a computing system utilizing clustered computers, servers, and components to act as a single pool of seamless resources. In general, server system 112 and server system 114 can be any computing device or a combination of devices with access to a plurality of computing devices without departing form the scope of the present invention, and server system 112 and server system 114 is capable of executing cache replication program 125 and has access to user interface 155. Server system 112 and server system 114 may include internal and external hardware components, as depicted and described in further detail with respect to FIG. 1.

Computing device 120 includes cache replication program (CRP) 125. Although cache replication program 125 is depicted in FIG. 1 as being integrated with computing device 120, in alternative embodiments, cache replication program 125 is remotely located from computing device 120. For example, cache replication program 125 can be integrated with client device 150, server system 112, server system 114 and/or replication target disks 140. Computing device 120 may include internal and external hardware components, as depicted and described in further detail with respect to FIG. 1.

In various embodiments of the present invention, client device 150 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 150 represents any programmable electronic device or combination of programmable electronic devices capable of executing machine readable program instructions and communicating with computing device 120, server system 112, server system 114 and./or replication target disks 140, and other computing devices (not shown) within SDN environment 100 via a network, such as network 130.

Client device 150 includes user interface 155. User interface 155 provides an interface between client device 150, computing device 120, server system 112, server system 114, and replication target disks 140. In some embodiments, user interface 155 can be a graphical interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, client device 150 accesses data communicated from computing device 120, server system 112, server system 114, and replication target disks 140 via client-based application that runs on client device 150. For example, client device 150 includes mobile application software that provides an interface between client device 150 and computing device 120, server system 112, server system 114, and replication target disks 140.

Embodiments of the present invention recognize that SDN environment 100 may utilize any combination of storage types to store data, including, but not limited to, various types of hardware, data formats, and database structures, and combinations thereof. In general, the present invention may utilize two or more different types of storage to store data, so long as one type of storage (i) requires less space, (ii) can be more readily accessible by cache replication program 125 that has access to user interface 155, and/or (iii) has a lower associated cost when compared to the other type of storage. In such embodiments, a cost for storage may be determined based on, but is not limited to, one, or a combination of, power consumption, network bandwidth consumption, a number of required clock cycles, time required to transfer and/or retrieve data, and storage space consumed in a data storage medium. Persons having ordinary skill in the art will understand that storage space of any type of storage is consumed when data is stored using that type of storage. In one embodiment, SDN environment 100 includes (i) a first type of storage that uses a first type of data format that allows a larger number of pieces of data to be stored in a given amount of storage space when compared to (ii) a second type of storage that uses a second type of data format that allows a smaller number of pieces of data to be stored in an equivalent amount of storage space. Further, in this embodiment, data stored using the second type of storage has a higher maximum input/output data rate (e.g., a higher read and/or write data rate) when compared to the first type of storage. As such, when contrasted, the first type of storage has a higher overall capacity for data storage, while the second type of storage has a greater data accessibility.

In this exemplary embodiment, CRP 125 and user interface 155 are stored on database 170. However, in other embodiments, CRP 125 and user interface 155 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between storage area network 110, computing device 120 and client device 150, in accordance with a desired embodiment of the present invention.

Server system 12 and server system 114 are depicted in FIG. 1 for illustrative simplicity, however, server system 112 and server system 114 can include any number of databases that are managed in accordance with CRP 125. In general, database 118A and database 118B represents data and CRP 125 manages the ability to view the data. In other embodiments, CRP 125 represents code that provides an ability to take specific action with respect to another physical or virtual resource and CRP 125 manages the ability to use and modify the data. User interface 155 can also represent any combination of the aforementioned features, in which CRP 125 has access to user interface 155. To illustrate various aspects of the present invention, examples of user interface 155 are presented in which user interface 155 represents one or more of, but is not limited to, a desktop environment and a social media account.

In the embodiment depicted in FIG. 1, CRP 125, at least in part, has access to user interface 155 and can communicate data stored on SAN 110 to client device 150. More specifically, user interface 155 defines a user of client device 150 that has access to data stored on database 118A and database 118B.

Replication target disks 140 are computing devices that are spread across SAN 110. In embodiments of the invention, replication target disks 140 operate to store replicated data from a first storage computing device to a second storage computing device. For example, replication target disks 140 store replicated data from a first storage computing device, such as server systems 112 to a second storage computing device, such as server systems 114.

In various embodiments, SDN environment 100 represents a hybrid cloud environment, wherein SDN environment 100 transfers data between two or more computing devices (i.e., server systems 112 and server systems 114). Further, embodiments of the present invention recognize that server systems can be a storage cluster, wherein the storage cluster transfers data between one or more storage cluster(s). For example, the SDN environment 100 contains a primary storage cluster (i.e., server system 112) that stores data. In general, the data can include, but is not limited to, block-chain data and object data. In another example, the SDN environment 100 contains a secondary storage cluster (i.e., server system 114) that receives data from the primary storage cluster. In certain such embodiments, it is to be understood that SDN environment 100 can include a plurality of computing devices (i.e., server system 112 and server system 114) without departing from the scope of the present invention.

In various embodiments, SDN environment 100 operates to transfer data between storage clusters by transferring data (i.e., data input/output (I/O)) from a primary storage cluster to secondary storage cluster. In certain such embodiments, it is to be understood that SDN environment 100 can include a plurality of storage clusters without departing from the scope of the present invention.

In one embodiment, CRP 125, with access to user interface 155, transfers I/O from client device 150 to database 118A located on a primary storage cluster. Additionally, CRP 125 stores I/O on database 118A as block data. The present invention recognizes that CRP 125 stores I/O on database 118A by other means now known or later known, without departing from the present invention. The I/O stored on database 118A can be accessed by CRP 125 with access to user interface 155 on a primary storage cluster, by utilizing CRP 125 to retrieve I/O from database 118A. CRP 125 maps the heat of I/O and executes a hierarchy of the I/O based on the access count from which CRP 125 receives a request from user(s) of user profile 155 to access and/or retrieve I/O from database 118A and database 118B. The resulting heat map of the hierarchy of I/O being accessed and/or retrieved is stored on database 118A and/or database 118B and is stored as descriptive data that describes the data represented by the heat map, e.g., metadata for the I/O data represented by the heatmap. In certain such embodiments, it is to be understood that the heat map of I/O can be stored on a plurality of computing devices (i.e., server system 112 and server system 114) and a plurality of I/O without departing from the scope of the present invention.

The heat map hierarchy defines and otherwise indicates which data is accessed more frequently by CRP 125 that has access to user interface 155. Hot data is data that is accessed above a threshold rate (i.e., has, or is predicted to have, at least a threshold number of accesses in a period of time) and may consume greater bandwidth to allow that hot data to be communicated at a greater rate from a first computing device, i.e., server system 112, to at least a second computing device, i.e., server system 114. In some embodiments, hot data is the data that CRP 125 included in SDN environment 100 which requires access to within a time period, and with a minimum rate of accesses during that time period, i.e., hot data is data that has been or is predicted to be accessed at least a threshold number of times over a given time period.

In addition to the embodiment recognized above, the present invention recognizes that in SDN environment 100, I/O stored on one storage cluster (i.e., primary storage cluster) replicates data on another storage cluster (i.e., secondary storage cluster).

In various embodiments, server system 112 communicates with server system 114 to replicate I/O stored on server system 112. Server system 112 utilizes CRP 125 to execute transfer of I/O from database 118A, to database 118B. For example, CRP 125 stores data on database 118A and/or transfers data from database 118A to database 118B. In another example, CRP 125 requests transfer of data from database 118A. In this example, CRP 125 receives the request from server system 114 and/or replication target disks 140 and transfers data from database 118A to database 118B. As recognized above, the heat map of the access count of the I/O is stored as descriptive data describing the I/O.

In one embodiment, CRP 125 analyzes the I/O from server system 112 and detects how the I/O is stored on database 118B. In some embodiments, CRP 125 analyzes the descriptive data describing the I/O and detects that the I/O is stored as block-chain data on server system 114. Alternatively, CRP 125 analyzes the descriptive data describing the I/O and detects that the I/O can be stored as object data on server system 114. For example, replication target disks 140 are spread across SDN environment 100 and operate to receive replication I/O detected to be stored on the cloud's block storage. In addition to block storage, replication target disks 140 operate to receive I/O from server system 114 that is detected for object storage and convert the incoming I/O from block data to object data and store the I/O on object storage.

In various embodiments, the cloud's object storage operates as persistent data storage. The data stored on the data storage is virtualized by the primary storage cluster, i.e., server system 112. Hardware virtualization is where the host machine is the machine in which virtualization occurs, and the guest machine is the virtual machine (VM). Host machines are software that runs on a physical hardware, whereas the guest machine is software the runs on a virtual machine. A hypervisor operates as software and/or firmware to create a virtual machine that runs on the host hardware.

Various components depicted in FIG. 1 may include virtualized computing systems such as, but limited to, a Virtual I/O Server (VIOS). Embodiments of the present invention recognize that: (i) All information about cached data on a VIOS that is serving client I/O is typically lost in a failover scenario. Thus, a new VIOS that replaces the old VIOS is unaware of hot data associated with serving the client I/O, which was already identified by and included with the old VIOS. (ii) That identifying the same hot data on the new VIOS consumes computing resources and increases the time it takes to populate the cache of the new VIOS with the hot data associated with serving the client I/O. Embodiments of the present invention also recognize that a VIOS that experiences failover may result in the loss of service to clients, which is typically viewed as being undesirable. As such, embodiments of the present invention recognize that reducing the time needed to recover from a VIOS failover may present benefits a computing system that is configured to provide services to client devices with minimal interruption to those services. Embodiments of the present invention provide storing information about the hot data (for example, by generating a data record that describes the hot data) as metadata and/or on a server system 112, server system 114, and replication target disks 140. Embodiments of the present invention recognize the need to store data as a data object on server system 112, server system 114, and replication target disks 140. In response to a failover, embodiments of the present invention provision available storage space on block storage and convert the hot data stored as data objects to data blocks and populate the block storage with the data blocks of the new VIOS.

In various embodiments, CRP 125 provides load balancing for traffic in one or more virtual networks based on the received network load information of the hosts, virtual tunnel endpoints (VTEP), and VMs of the SDN environment. During operation, the VTEP performs occasional multicast messages to various hosts, VTEPs and VMs of the SDN environment 100 to determine IP and MAC addresses of the devices or virtual devices for the various networks of the SDN environment 100. For example, a VTEP sends an Address Resolution Protocol (ARP) request for MAC addresses of devices connected to the virtual network associated with the VTEP and other networks, physical or virtual. In various embodiments, the VTEPs send the encapsulated packet to CRP 125. Based on the destination MAC and IP addresses in the encapsulated packet, CRP 125 sends the packet to a corresponding VTEP (e.g., a VTEP associated with server system 114) based on the addressing of the packet. The VTEP, in turn sends the payload (i.e., the original Ethernet frame) to the corresponding VM (e.g., a VM of server system 114), thereby virtualizing at least a portion of a local network (e.g, a portion of SAN 110). CRP 125 directs packets and requests to hosts, VIOSs, VTEPs, and VMs associated with a destination virtual network to provide optimal usage of resources of the SDN environment. In one scenario, during provisioning of a new VIOS, in response to a VIOS failover or a predicted VIOS failover, CRP 125 selects a VTEP on a given host from a group of available VTEPs and hosts based on the current consolidated bandwidth handled by each given VTEP. For example, if one VTEP currently has less bandwidth than another VTEP, the CRP 125 selects the first host as a location into which a new VIOS is provisioned using the VTEP. In another scenario, CRP 125 selects a host/VTEP based on a ratio between the current bandwidth and allocated bandwidth of each host/VTEP. For example, if one VTEP of a host currently has 8 gigabits per second (gbps) of bandwidth and 10 gbps of allocated bandwidth and another VTEP on another host has 9 gbps of current bandwidth and 10 gbps of allocated bandwidth, then CRP 125 selects the first VTEP since that VTEP is less utilized than the latter (i.e., 80% utilization of allocated bandwidth versus 90% utilization).

When a given VIOS experiences or is predicted to undergo failover, requests being sent to the VMs of that VIOS may be held for later processing. For example, a virtual machine on a VIOS supports a number of applications. Requests are received for the applications and processed accordingly. In one such scenario, CRP 125 determines that the VIOS is predicted to undergo failover, CRP 125 initiates provisioning of a new VIOS. However, until the new VIOS is provisioned and the cache populated, CRP 125 redirects the requests being received for the original VIOS and holds them for later processing using the new VIOS. Embodiments recognize that selection of a host for a new VIOS may benefit from accounting for limitations in communication for that host. Embodiments further recognize that selection of a given host may benefit from accounting for the size of a backlog of requests that are stored for processing by the new VIOS. For example, CRP 125 determines that it will take two minutes to provision a new VIOS on a new host and to populate the associated cache. For those two minutes, CRP 125 predicts that a backlog of a given size will accumulate based on the expected number of requests for the VMs/applications that are supported by the original VIOS. As such, CRP 125 selects a host and communication option (e.g., a specific VTEP) that are predicted to allow the newly provisioned VIOS to not only handle new requests being made to the supported VMs/applications but to also process the backlogged requests within a predetermined time period (e.g., thirty seconds). In some embodiments, CRP 125 instructs the newly provisioned VIOS to ensure that the backlogged requests are processed before more recent requests are processed.

In some embodiments, CRP 125 selects a VM, a newly provisions VIOS associated with a VTEP, based on current bandwidth, allocated bandwidth, and the number and type of active connections for each available VM on the newly provisioned VIOS. As such, CRP 125 selects a VM with less current bandwidth, ratio of current to allocated bandwidth, active connections, or resource usage based on active connections types. In some scenarios, such as when more than one VTEP is provisioned for a host, CRP 125 selects VTEPs and VIOS/VMs based on current network load of a host. CRP 125 combines all network load information for a host for each provisioned VTEP and VIOS/VM of the host. Based on the current network load information for the provisioned VTEPs and VMs, CRP 125 selects a host, VTEP, VIOS and VM from the SDN environment 100 when processing a backlog of requests for a failed VIOS.

The present invention recognizes, that a hypervisor operates to take snapshots of the state of the virtual machine, and the persistent data storage devices. Further, the virtual machines utilize virtual disks to store data on persistent data storage. Snapshots are used during recovery from migration and/or failover.

Migration—a hypervisor transmits snapshots from one host machine to a second host machine; wherein, the VM is temporarily stopped, snapshotted, moved, and resumed by a second host machine. Snapshots that are older and kept in sync regularly allow the VM to operate more quickly and allow the VM to provide uninterrupted service while the first host machine is undergoing physical maintenance.

Failover—while a first host machine experiences failure, failover allows VM to continue operations. VM operates from the last-known coherent state, i.e., the last snapshot, rather than the current state, i.e., updated snapshot.

In some embodiments, primary storage clusters operate to serve I/O requests. The primary storage clusters connect to cloud sites, i.e., server system 114, by an IP network, i.e., network 130, wherein, the cloud sites allow replicate the data for disaster recovery purposes. Data replication improves the availability of data by storing the data on one or more sites or nodes. Data replication copies data from a database structure on a first host machine and communicates the data to, at least, a second database structure, allowing one or more systems and/or software, such as CRP 125, access to the data. Replication allows the data to maintain is a consistent updated state and is synchronized with the first host machine. Replication occurs by transactional replication, snapshot replication, and merge replication.

Transactional replication—systems and/or software, such as CRP 125, receive full initial copies of the database structure and receive consistent updates as the data changes. The data is copied in real time from the host machine to the receiving database structure, i.e., virtual machine, in the order in which the changes occur.

Snapshot replication—distributes data exactly as it appears at a specific moment in time and does not monitor for updates to the data. The entire snapshot is generated and sent to the systems and/or software, such as CRP 125, that have access to user interface 155. Snapshot replication is used when changes are infrequent, it operates at a slower rate than transactional replication because each attempt to replicate the data it moves multiple records from one end to the other end. Snapshot replication is beneficial to perform initial synchronization between the host machine and the virtual machine.

Merge replication—Data is communicated from two database structures and stored in a singular database. Merge replication allows the host machine and virtual machine to independently make changes and communicate the changes to the singular database. Merge further allows the data from a host machine to be communicated to at least one other virtual machine.

As recognized above, replication target disks are spread across the cloud site and receive the data communicated from server system 112. CRP 125 transmits the replicated data to block storage that is virtualized on server system 114.

In various embodiments, CRP 125 transfers data from server system 112 to server system 114. CRP 125 receives the data and replicates the data and stores the data in object storage, i.e., database 118B and/or replication target disks 140. Object storage is virtualized by a hypervisor executing on server system 114. In addition to the data being stored as object data, descriptive data describing the block storage details is attached to the data and stored as object data in object storage.

In various embodiments, primary storage cluster experiences failure, triggering DR protocol. During DR protocol, CRP 125 fetches the data in object storage and analyzes the heat map stored as descriptive data describing the I/O data. CRP 125 dynamically provisions block space on the cloud sites block storage for additional block data. Based on the heat map, descriptive data describing the I/O data is analyzed by CRP 125 to identify object data. CRP 125 converts the identified object data to block data that is targeted for block storage. CRP 125 transmits the targeted block data to the respective block storage tiers. Certain embodiments of the present invention provide selective conversion of data, in a storage volume, from object storage to block storage. In some such embodiments, object storage is virtualized by the same manipulation engine that generates block storage. In some embodiments and scenarios, such a manipulation engine and approach to data storage reduces the number of blocks required to store the data in a cloud storage environment.

In another embodiment, once the targeted block data is transmitted to the respective block storage tiers, the block data is accessible to one or more systems and/or software, such as CRP 125, that has access to user interface 155 while reconstruction of the primary storage database is in operation. Once the primary storage database is reconstructed after failure, CRP 125 requisitions block data stored on block storage tiers and data stored in object storage and CRP 125 transfers the data to primary storage database, i.e., server system 112. Upon successful transfer of data on the secondary storage database, i.e., server system 114, CRP 125 converts block data to object data and stores the data in object storage. Once all data is successfully converted to object data, CRP 125 dynamically releases block storage space to cloud service providers.

In certain such embodiments, it is to be understood that SDN environment 100 can include a plurality of computing devices (i.e., server system 112 and server system 114) without departing from the scope of the present invention.

In some embodiments, the high speed storage and the other type of slower memory storage both utilize a similar type of storage medium and/or protocol but the high speed storage is physically located closer to a central processing unit (CPU) in a computing system, when compared to a location of the other slower type of memory storage, e.g., a storage device connected to the CPU via a bus. In such embodiments, an increase in the distance a signal has to travel between a given storage media/medium and the CPU reduces the I/O speed for the given storage media/medium. As such, the primary storage has an increased I/O rate when compared to the I/O rate of the secondary storage. In such an embodiment, the pathway length between the CPU and the faster speed memory yields an increase in I/O rate for the faster speed memory, relative to the other slower type of memory storage, since the distance signals have to travel between the faster memory and CPU is less than the distance a signal has to travel between the CPU and the other type of memory. In one embodiment, the faster speed memory is located in a lower tier of a memory hierarchy than the other type of memory, e.g., L4—DRAM is in a lower memory tier than a hard disc drive in a memory hierarchy.

Embodiments recognize that moving all of the data for a system onto an all-flash array may be detrimental in terms of consumption of computing resources when only part of that data is active/being used at any one time. In some embodiments, caching for select applications follow the Pareto principle, also known as the 80/20 rule, which means that 80% of the I/O load is performed by only 20% of the data. Actual figures/percentages may vary in different embodiments and with respect to select applications. However, such ratios often match up to the principle in operation. In a shared storage array, the data will also typically follow a "long tail" curve, with a small number of logical unit numbers (LUNs) creating the majority of the workload. Embodiments recognize that, in certain scenarios, a large amount of data sitting on all-flash arrays is not being used.

Embodiments recognize and provide for at least two caching processes that create either (i) a read cache (where the cache services only read I/O requests) or (ii) a write cache (which services a combination of read and write I/O requests). Embodiments described herein may support one or both methods at the same time, or any other caching approach that falls within the scope of the invention. For write I/O caching, embodiments recognize and provide for at least three methods: write-though, write-back, and write-around. Embodiments described herein may support one or a combination of these methods at the same time, or any other write I/O caching approach that falls within the scope of the invention.

Write-though—in this method the write I/O is written to the cache and immediately written to the backing store before the write is confirmed to the host. Subsequent read requests for the data are then serviced from cache unless the data changes. The write-though method provides high performance for read intensive type workloads and where data has a high likelihood of being re-read soon after write, but may not improve write performance.

Write-back—this process writes data initially to the cache and confirms the I/O back to the host immediately. The data is then offloaded to the backing store some time later as an asynchronous process. This method results in high performance for read and write I/O, however the solution is more exposed as data could be lost if a server or cache failure occurs before all data is de-staged to the backing store. Write-back solutions therefore need some additional protection such as clustering to mitigate hardware failure.

Write-around—this method writes data directly to the backing store rather than into the cache and so only improves read I/O requests. Write-Around solutions are useful where data being written is unlikely to be immediately referenced after the write occurs. It protects against "cache pollution" where the cache fills with inactive data.

Certain benefits of cache solutions are herein articulated to show that cache solutions can improve application performance by using a targeted approach to deploying storage resources. The issue of performance may find emphasis in virtualized environments such as Virtual Server Infrastructure (VSI) and Virtual Desktop Infrastructure (VDI) deployments where the effect of virtualization can create an I/O "blender" effect. This effect herein refers to a phenomenon wherein I/O requests can appear to be almost totally random and relatively unpredictable from the perspective of an application on a VM of a VIOS, since data for servers and applications are distributed across shared data-stores.

Embodiments recognize that, from a technical perspective, use of caching approaches may deliver at least one of, or a combination of: (i) Reduced latency. In other words, I/O responses can be served from local storage thereby eliminating many parts of the I/O stack, which may reduce the amount of time taken to process read/write requests. It is herein noted that both DRAM and flash storage may provide very low latency responses when compared to the performance of other types of storage. (ii) Reduced external I/O. In some scenarios caching reduces or eliminates the need to access an external backing store for the majority of active I/Os. This reduced load on external storage provides an opportunity to reduce contention on external devices and the storage network overall. (iii) Higher throughput. For example, low latency may translate to increased throughput, especially for read-intensive applications. (iv) Increased asset utilization. For example, using a caching solution can ease the pressure on external backing store, potentially increasing capacity utilization or avoiding hardware upgrades.

In virtual server environments, embodiments may implement caching in a number of ways: (i) Within the Hypervisor—wherein the caching software is integrated into the I/O path of the hypervisor. For example, in the device drivers of certain VM software (VMware) environments. The device driver makes decisions on which data to cache in a transparent fashion to the hypervisor itself. (ii) Within a VM, in such solutions, the caching software may sit within a virtual machine on the hypervisor. The VM presents storage to the hypervisor through standard storage protocols. The hypervisor sees the storage as standard externalized storage resources, while the storage VM is responsible for providing cached data blocks and offloading updates to the backing store (if that feature is supported).

In various embodiments, hot data is understood to be data that is predicted to be requested within a time period and at a rate above a threshold by one or more applications. In contrast, cold data, is data that is predicted to have a rate of requests within a time period that is below the threshold. In some embodiments, hot data is identified based on, for example, thresholds that leverage the Pareto principle, which means that the hot data is predicted to be used to perform 80% of the I/O load. Embodiments recognize that other approaches may be leveraged to identify and differentiate hot data from cold data and subsets of hot data from other types of hot data. For example, the top five percent of data may be selected for caching based on a heat map that represents how often a given piece of data is accessed in comparison to other data that is accessed. Further still, within that top five percent, the hottest top ten percent of that hot data is selected for a first type of data storage while the other ninety percent of the hot data is placed into a second type of data storage. Generally, the hottest data is stored such that the hottest data of the hot data has the highest accessibility availability, i.e., greatest read and/or write rate, of all the stored hot data.

In some embodiments, hot data is identified by a cache engine running on a computing device, e.g., a server. In general, server side flash caching is a mechanism through which a computing device, i.e., a host, caches hot Storage Area Network (SAN) disk data on the host attached flash devices. In some embodiments, the host attached flash device is physically attached to the host, while in other embodiments the host attached flash device is physically separate from the host device but is accessible by the host device via the SAN. Host attached flash devices may include, but are not limited to, (i) solid state devices (SSD), (ii) Peripheral Component Interconnect (PCI) devices, and (iii) Serial Attached Small Computer System Interface (SCSI), also called SAS, I/O drawer devices. In general, server-side caching provides the capability to cache storage data of target disks from a SAN to flash devices located on a computing device, such, for example, as a server. In some embodiments, based on storage data access pattern of a given application, the caching algorithm determines hot data and stores that hot data in flash devices. If possible, future read requests data are served from the cached data on the flash devices improving application read performance. In some embodiments, write operations are monitored by the caching software to invalidate and/or evict certain cache entries from cache before write operations are sent to the SAN for processing.

Figure 2:
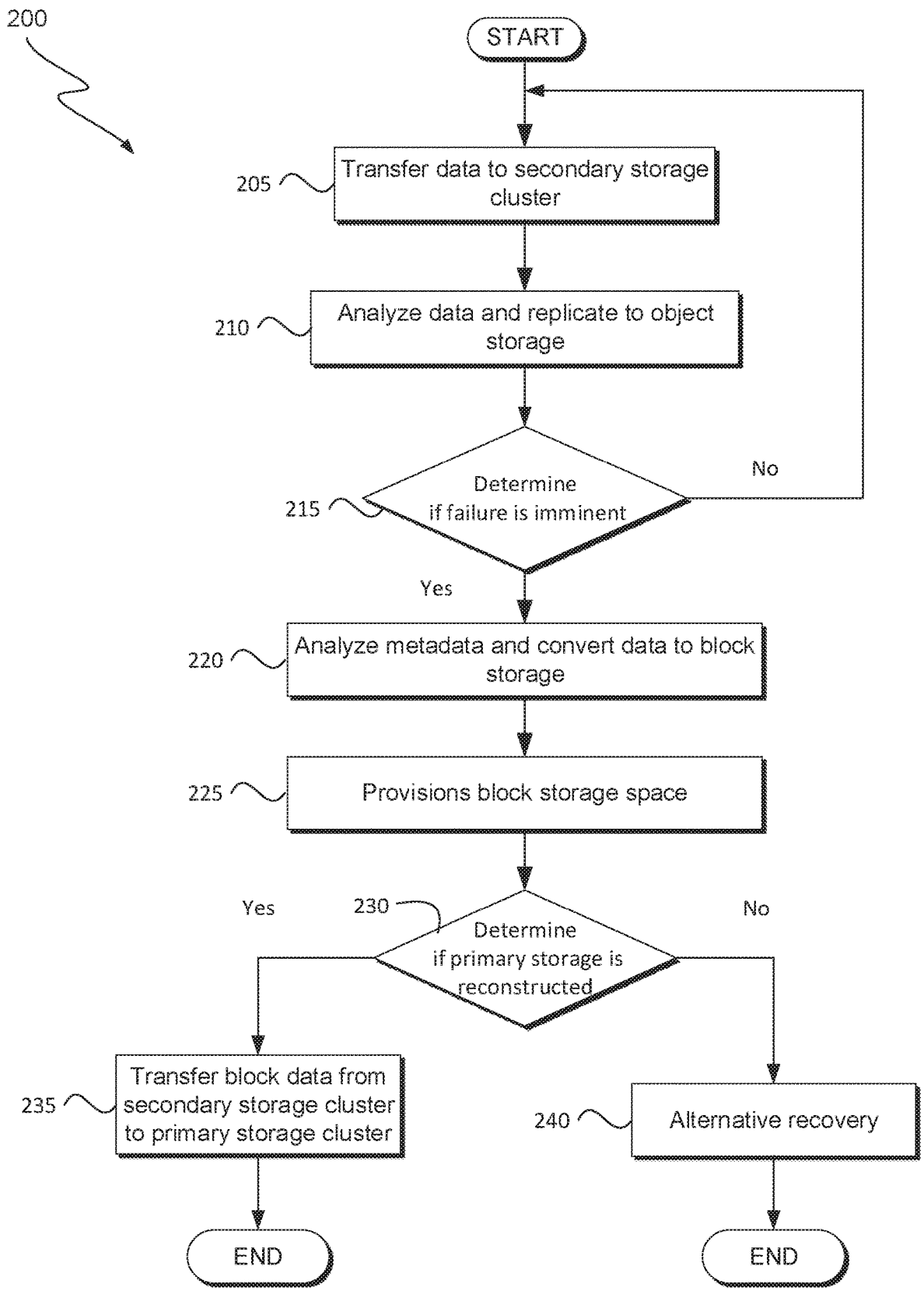
FIG. 2 illustrates operational processes of a cache replication program executing on a computing device within the environment of FIG. 1, in accordance with at least one embodiment of the present invention.

FIG. 2 is a flowchart depicting operations for executing a DR protocol for a cloud supported site in an SDN environment 100, in accordance with an illustrative embodiment of the present invention. More specifically, FIG. 2 depicts combined overall operations 200 of server system 112, server system 114, replication target disks 140, CRP 125, user interface 155, database 118A and database 118B, respectively, to manage the communications of data from a first computing device to at least one other computing device during failover of a first computing device. In some embodiments, however, operations 200 represents logical operations of CRP 125, wherein interactions between CRP 125, server system 112, server system 114 and/or user interface 155 represent interactions between logical units executing over network 130. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated at any operations. Additionally, any operation, of flowchart 200, can be resumed at any time.

In one embodiment, CRP 125 has access to user interface 155 and transmits data to server system 112. CRP 125 operates to store the data on database 118A. Embodiments of the present invention recognize that (i) there are a variety of alternate ways in which CRP 125 accesses user interface 155 to store the data, (ii) CRP 125 can store the data on a plurality of computing devices, and (iii) that such variety is encompassed by embodiments herein. The embodiment of the present invention recognizes that CRP 125 can communicate data with server system 112. In other embodiments, the data is stored on server system 112 by operations of CRP 125.

In another embodiment, based on the context of the data, the access count of the data stored on database 118A, CRP 125 generates a heat map using the access count of the data stored on database 118A. In some embodiments, CRP 125 stores the heat map as descriptive data that describes the data, e.g., in the form of metadata that describes the data. In addition to the previous embodiment, the present invention recognizes that CRP 125 can store the heat map as data on a first computing device or various computing devices spread across network 130.

In one embodiment, responsive to data being transferred to database 118A located on server system 112, CRP 125 communicates the data to replication target disks 140 (operation 205). Replication target disks 140 operate to replicate the data and store the data as object storage. Further, replication target disks 140 communicate the data to server system 114 and CRP 125 operates to store the data on database 118B. For example, replication target disks 140 analyze a heat map extracted from the metadata that describes the data and determines whether the data is stored as object storage or block storage based, at least in part, on how hot the data is (operation 210). Further, for the hottest portion of the hot data, replication target disks 140 operates to store that portion of hottest data as block storage. Additionally, replication target disks 140 can operate to store cold data as object storage. In general, this hottest data is data that is accessed above a threshold rate that is higher than the threshold rate used to differentiate hot data from cold data (i.e., has, or is predicted to have, at least a threshold number of accesses in a period of time) and may consume greater bandwidth to allow that hot data to be communicated at a greater rate from a first computing device, i.e., server system 112, to at least a second computing device, i.e., server system 114. For example, if the twenty percent most accessed data is considered to be "hot" data, then the very hottest of that subset may represent the top two percent of that most accessed data.

In some embodiments, CRP 125 retrieves data from database 118A and prepares the data to be communicated across various computing devices across SDN environment 100. In various embodiments, CRP 125 communicates the data located on server system 112 to server system 114. Server system 114 receives the data from server system 112 and analyzes the heat map meta data stored on the data. For example, if the data is targeted for replication, CRP 125 replicates the data and stores the data in object storage (operation 210). In another example, the data may be targeted for block storage, wherein, CRP 125 transfers the data and stores the data in block storage. In various embodiments, CRP 125 retrieves data from database 118A and prepares the data to be communicated across various computing devices across SDN environment 100. In various embodiments, CRP 125 communicates the data located on server system 112 to server system 114. Server system 114 receives the data from server system 112 and analyzes the heat map meta data stored on the data. For example, if the data is targeted for replication, CRP 125 replicates the data and stores the data in object storage (operation 210). In another example, the data may be targeted for block storage, wherein, CRP 125 the data and stores the data in block storage.

In various embodiments, CRP 125 can operate to communicate the data to server system 112 and CRP 125 stores the data as data objects on database 118B. For example, CRP 125 analyzes a heat map extracted from metadata that describes the data and determines whether the data is stored as object and/or block storage based, at least in part, on how hot the data is. CRP 125 operates to store the hotter data as block storage, and the colder data object storage. In various embodiments, the replication target disks 140 store data based, at least in part, on the hottest data (for example, the hottest ten percent of the hot data) as block storage, and the remaining data (for example, the remaining ninety percent of the hot data) is stored as object storage. In some embodiments, the amount of hot data to be stored as block storage is based, at least in part, on a determined amount of available storage capacity. For example, CRP 125 receives a message from a storage system included in the heat map stored as metadata or stored on database 118A and/or database 118B. In some embodiments, CRP 125 analyzes a heat map extracted from the metadata associated with the data and stores the data based, at least in part, on a determination of the ten percent of the hottest data. The top ten percent of the hottest data is stored as block storage, and the remaining ninety percent of the hot data is stored as object storage on database 118B. Embodiments of the present invention recognize that the data being communicated by CRP 125 can transmit the data to replication target disks 140. In some embodiments, CRP 125 transmits the data from server system 112 to server system 114. In other embodiments, replication target disks 140 transmits the data to server system 114. In general, the data can be communicated by any combination of the aforementioned communications. The present invention recognizes that people having ordinary skill in the art understand that hot data is data that has a greater access rate by systems and/or software when compared to cold data, which is less frequently accessed by systems and/or software. In general, CRP 125 operates to store hot data such that cache is populated using hot data. Further, CRP 125 distinguishes between different levels of hotness such that the hottest data is stored using block storage and less hot data is stored using object storage.

In operation 210, the heat map of the metadata of the data, stored on server system 112, is analyzed to determine how the data is stored. In some embodiments, the heat map of the data is stored on the metadata of the data. In various embodiments, the heat map is stored on database 18A and/or database 118B or replication target disks 140. The heat map contains information that describes the access count of the data and creates a hierarchy of the access count. Further, the heat map operates to communicate to CRP 125 and/or replication target disks 140 which data is stored in object storage and which data is stored as block storage. For example, CRP 125 analyzes the heat map of the data communicated from server system 112 to replication target disks 140. CRP 125 executes the transmission of the data to block storage located on replication target disks 140 and/or server system 114 based, at least in part, on the hierarchy of the heat map. Alternatively, CRP 125 analyzes the heat map of the data executes the transmission of the data to object storage located on replication target disks 140 and/or server system 114 based, at least in part, on the hierarchy of the heat map.

In various embodiments, replication target disks 140 receive the data from server system 112 and analyze the heat map of the data communicated from server system 112. In another embodiment, replication target disks 140 execute the transmission of the data to block storage located on replication target disks 140 and/or server system 114 based, at least in part, on the hierarchy of heat map. Alternatively, replication target disks 140 execute the transmission of the data to object storage located on replication target disks 140 and/or server system 114 based, at least in part, on the hierarchy of the heat map.

In one embodiment of the present invention, server system 112 may experience failover and must be reconstructed before server system 112 and be further used. If server system 112 experiences failover, SDN environment executes DR protocol. DR protocol operates to protect the data stored on SDN environment 100. During DR protocol, the data that is stored on database 118B and/or replication target disks 140, while server system 112 is being reconstructed. DR protocol further operates to provision storage capacity and create block space for the data stored in object storage on replication target disks 140 and/or server system 114. Upon provisioning available block space on block storage, DR protocol converts hot data from object data to block data and communicates the hot data to block storage to be accessible by CRP 125 during DR protocol. If server system 112 can be reconstructed, DR protocol releases the data stored in object storage and block storage on replication target disks 140 and/or server system 114 to server system 112, and DR protocol deprovisions available space on block storage and DR protocol terminates.

If CRP 125 determines that server system 112 may experience failover and that CRP 125 executes DR protocol, as discussed in FIG. 2 (decision 215, YES branch), CRP 125 communicates all data from server system 112 to server system 114 and/or replication target disks 140. CRP 125 dynamically provisions block storage space on server system 114 and/or replication target disks 140 to transfer targeted data from object storage to block storage (operation 225). CRP 125 analyzes the heat map of the data and targets data, respectively, for block storage (operation 220). The heat map of the data operates to communicate to CRP 125 which data can be accessible during failover of server system 112. Further the heat map indicates to CRP 125 a hierarchy of the data in which tier of block storage the data is to be communicated. CRP 125 converts the data, that is targeted for block storage, from object storage to block storage (operation 220).

In some embodiments, systems and/or software that accesses user interface 155 determines server system 112 may experience failover and direct CRP 125 to execute DR protocol, as discussed in FIG. 1 (decision 215, YES branch), CRP 125 communicates all data from server system 112 to server system 114 and/or replication target disks 140. CRP 125 dynamically provisions block storage space on server system 114 to transfer targeted data from object storage to block storage (operation 225). CRP 125 analyzes the heat map of the data and targets data, respectively, for block storage. The heat map of the data operates to communicate to CRP 125 which data must be accessible during failover of server system 112. Further the heat map indicates to CRP 125 a hierarchy of the data in which tier of block storage the data is to be communicated. CRP 125 converts the data, that is targeted for block storage, from object storage to block storage (operation 220).

In various embodiments, replication target disks 140 determines that server system 112 may experience failover and executes DR protocol, as discussed in FIG. 1 (decision 215, YES branch), replication target disks 140 communicates all data from server system 112 to replication target disks 140 and/or server system 114. Replication target disks 140 direct CRP 125 to dynamically provisions block storage space on server system 114 to transfer targeted data from object storage to block storage (operation 220). Replication target disks and/or CRP 125 analyze the heat map of the data and targets data, respectively, for block storage. The heat map of the data operates to communicate to replication target disks 140 and/or CRP 125 which data must be accessible during failover of server system 112. Further the heat map indicates to replication target disks 140 and/or CRP 125 a hierarchy of the data in which tier of block storage the data is to be communicated. Replication target disks 140 and/or CRP 125 converts the data, that is targeted for block storage, from object storage to block storage (operation 220).

If CRP 125 determines that failure of server system 112 is not imminent or predetermined, CRP 125 continues to communicate data from server system 112 to server system 114 and/or replication target disks 140 over network 130 (decision 215, NO branch). As recognized above, CRP 125 replicates the data to a secondary database and analyzes the heat map of the meta for storage (operation 205 and operation 210).

Those skilled in art recognize, that a failover of a computing device and/or server can be predicted or known to be imminent based upon programs that analyze the state of the hardware and/or software. The present invention recognizes that different patterns of activity for VIOS are indicative of an imminent or predicted failover.

In operation 220, CRP 125 analyzes the heat map to convert hot data stored in object storage to block during DR protocol. In one embodiment, CRP 125 analyzes the heat map and extracts the hot data from the cache of server system 114 and/or replication target disks 140. Further, CRP 125 converts the hot stored as object storage to block storage.

In operation 225, CRP 125 communicates with the cloud service provider (CSP), included in network 130, and directs the CSP to dynamically provision block storage space during DR protocol. In various embodiments, CRP 125 communicates the hot data to block storage data on the cloud of server system 114 and/or replication target disks 140. In one embodiment, CRP 125 enables the data stored in block storage to be accessible by CRP 125 with access to user interface 155. In a second embodiment, systems and/or software with access to user interface 155 can direct CRP 125 to dynamically provision space on block storage, and direct CRP 125 to convert various data stored as object storage to block and communicate the data to block storage. CRP 125 with access to user interface 155 may direct CRP 125 to convert data stored in block storage to object storage to dynamically provisions space on block storage for data to be communicated from object to block storage.

If CRP 125 determines the primary storage database, i.e. server system 112, has been reconstructed, CRP 125 requisitions the data in block storage and object storage on server system 114 and/or replication target disks 140 for transfer to the primary storage database (decision 230, YES branch). In various embodiments, CRP 125 requisitions the data from block storage and transfers the data from server system 114 to server system 112. Further, CRP 125 communicates data utilizing block storage to ensure that the data being communicated to block storage is accessible to the systems and/or software with access to user interface 155. In some embodiments, CRP 125 requisitions the data from object storage and transfers the data from server system 114 to server system 112. In various embodiments, CRP 125 can requisition data from replication target disks 140 and communicate the data to server system 112.

If CRP 125 determines that primary storage database, i.e., server system 112, has not been reconstructed, CRP 125 communicates with server system 114 and retains the data on database 118B (operation 240, NO branch). In some embodiments, CRP 125 continues to retain the data on replication target disks 140 until primary storage database is reconstructed.

In operation 235, CRP 125 executes transfer of block storage and object storage data stored on one or more nodes 10 of cloud computing environment 50 to server system 112.

In some embodiments, CRP 125 communicates with server system 114 and/or replication target disks 140 and executes transfer of the data to server system 112. Further, CRP 125 retains data as block storage during transfer of data to server system 112 to ensure data is accessible to CRP 125 with access to user interface 155. In various embodiments, CRP 125 can execute conversion of data in object storage to block storage during transfer of data from server system 114 and/or replication target disks 140 to server system 112.

In various embodiments, replication target disks 140 execute transfer of data from replication target disks 140 and/or server system 114 to server system 112. Further, replication target disks 140 retain data as block storage during transfer of data to server system 112 to ensure data is accessible to systems and/or software with access to user interface 155. In various embodiments, replication target disks 140 can execute conversion of data in object storage to block storage during transfer of data from replication target disks 140 to server system 112.

In one embodiment, CRP 125 with access to user interface 155 executes transfer of data from server system 114 or replication target disks 140 to server system 112.

In operation 240, CRP 125 executes alternative recovery if primary storage database cannot be reconstructed and/or reconstruction is taking longer than may be expected. In various embodiments, CRP 125 retains data on replication target disks 140 and/or server system 114 (i.e., secondary storage database) during alternative recovery. Data targeted as block data remains in block storage so that CRP 125 has access to user interface 155. In some embodiments, secondary storage database may operate to serve as the interim primary I/O storage database during alternative recovery.

Figure 3:
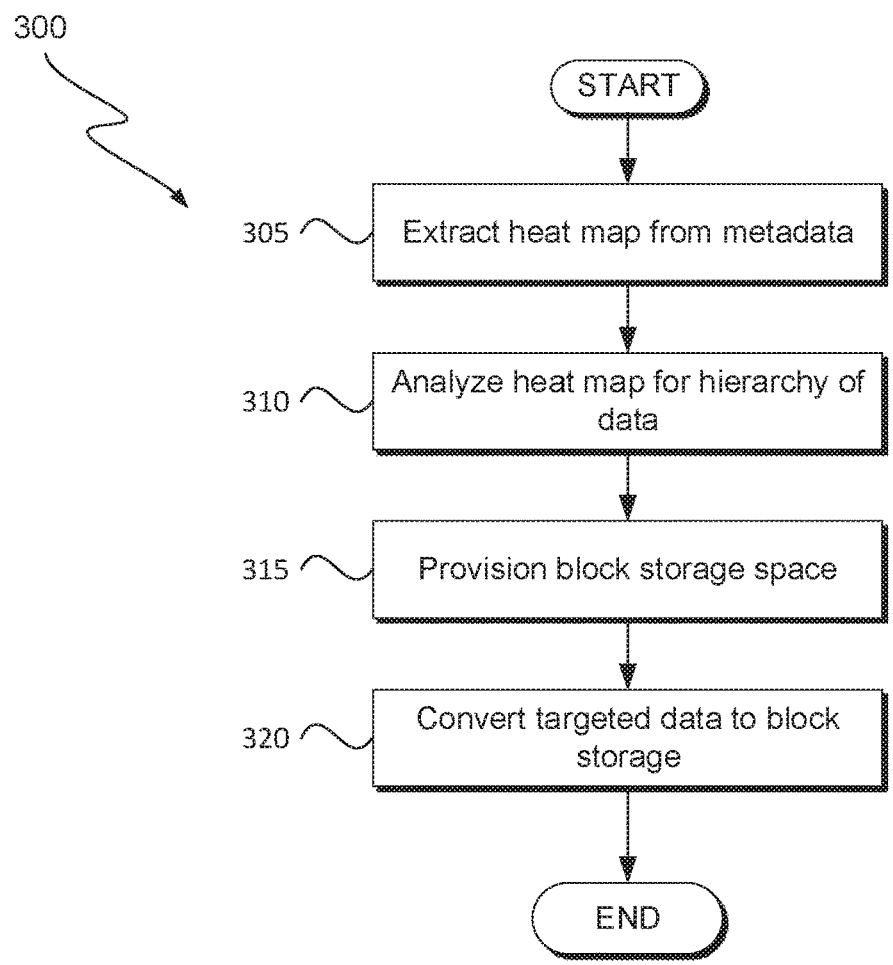
FIG. 3 illustrates operational processes of the cache replication program executing operations to provision block storage space on a server system within the environment of FIG. 1, in accordance with at least one embodiment of the present invention.

FIG. 3 is a flowchart depicting operations for converting data in object storage to block storage within the SDN environment 100 depicted in FIG. 1, in accordance with an embodiment of the present invention.

Operations 300 represents logical operations of CRP 125 that interact and influence operations 200 of server system 112, server system 114, and replication target disks 140, as depicted in FIG. 2. In some embodiments, operations 300 can include one or more elements of operations 200, in which case interactions between operations 200 and 300 represent logic of CRP 125 and replication target disks 140.

When primary storage experiences failover, and DR protocol is triggered CRP 125 attempts to transfer hot data from object storage to block storage for the data to be accessible by systems and/or software with access to user interface 155. CRP 125 extracts the heat map from the metadata (operation 305). In some embodiments CRP 125 extracts the heat map from database 118A and/or database 118B. CRP 125 analyzes the heat map to create a hierarchy of hot data to be transferred from object storage to tiers of block storage (operation 310). CRP 125 executes logic to create a hierarchy of hot data and assigns a tier value to the data to be stored in block storage.

In operation 315, CRP 125 contacts the CSP and directs the CSP to dynamically provision storage space in block storage. In some embodiments, CRP 125 operates to communicate with the CSP and server system 114 and/or replication target disks 140. One skilled in the art would recognize that to provision space on block storage means to access the resources of the storage virtualization device and trigger the addition or removal of storage space on demand. Upon space being provisioned, respectively, for the hot data to be transferred from object storage to block storage, CRP 125 executes conversion of hot data.

In various embodiments, replication target disks 140 contacts the CSP and directs the CSP to dynamically provisions storage space in block storage. In some embodiments, replication target disks 140 operates to communicate with the CSP and server system 114. One skilled in the art would recognize that to provision space on block storage means to access the resources of the storage virtualization device and trigger the addition or removal of storage space on demand. Upon space being provisioned, respective, for the hot data to be transferred from object storage to block storage, replication target disks 140 transfers the hot data to the allocated storage space.

In operation 320, CRP 125 targets hot data for conversion to block storage and executes conversion. CRP 125 converts hot data stored in object storage to block data to be transferred to block storage. Upon CRP 125 converting hot data to block data, CRP 125 communicates the data to block storage located on replication target disks 140 and/or server system 114. In some embodiments, replication target disks 140 can convert hot data from object data to block data. Additionally, replication target disks 140 communicates the data to block storage located on replication target disks 140 and/or server system 114.

Figure 4:
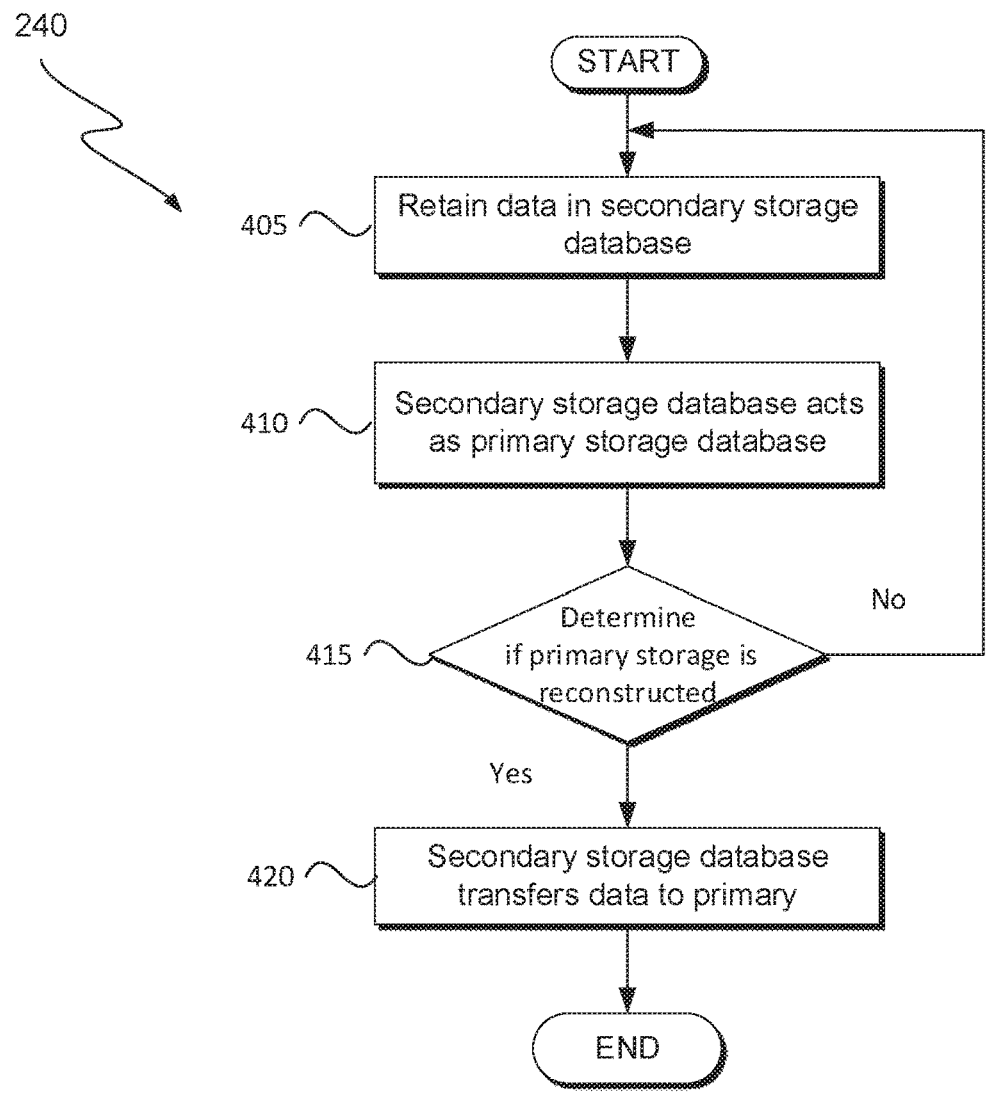
FIG. 4 illustrates operational processes of the cache replication program executing operations to transfer data from a secondary storage database to a primary storage database, on a server system within the environment of FIG. 1, in accordance with at least one embodiment of the present invention.

FIG. 4 is a flowchart depicting operations for alternative recovery to retain data on the secondary storage database within the SDN environment 100 depicted in FIG. 1, in accordance with an embodiment of the present invention.

Operations 240 represents logical operations of CRP 125 that interact and influence operation 240 of server system 112, server system 112, and replication target disks 140 as depicted in FIG. 2. In some embodiments, operations 240 can include one or more elements of operations 200, in which case, interactions between operations 200 and operations 240 represent logic of CRP 125 and server system 112 and/or replication target disks 140 and server system 114.

When primary storage database (i.e., server system 112) experiences failover, CRP 125 retains data on secondary storage database (i.e., replication target disks 140 and/or server system 114) (operation 405).

In operation 410, CRP 125 executes alternative recovery, while primary storage database is under reconstruction, wherein secondary storage database operates as an interim primary I/O storage database. In various embodiments, CRP 125 operates to retain the data on the secondary storage database. In another embodiment, CRP 125 operates to store data that CRP 125 has access to user interface 155. In addition to, CRP 125 operates to analyze the heat map stored as metadata on the data stored on secondary storage database and operates to convert data from object storage to block storage in accordance with the heat map, as recognized above, and stores the converted data to block storage.

If CRP 125 determines that primary storage database has been reconstructed, after alternative recovery was executed, CRP 125 requisitions the data in block storage and object storage on server system 114 and/or replication target disks 140 for transfer to the primary storage database (decision 415, YES branch). In various embodiments CRP 125 requisitions the data from block storage and transfers the data from server system 114 to server system 112. Further, CRP 125 communicates data utilizing block storage to ensure that the data being communicated to block storage is accessible by CRP 125 with access to user interface 155. In some embodiments, CRP 125 requisitions the data from object storage and transfers the data from server system 114 to server system 112. In various embodiments, CRP 125 can requisition data from replication target disks 140 and communicate the data to server system 112.

If CRP 125 determines that primary storage database has not been reconstructed, CRP 125 communicates with server system 114 and retains the data on database 118B (operation 415, NO branch). In some embodiments, CRP 125 will continue to retain the data on replication target disks 140 until primary storage database is reconstructed.

In operation 420, primary storage database is reconstructed, and CRP 125 executes transfer of block storage and object storage data from the cloud to server system 112. In some embodiments, CRP 125 communicates with server system 114 and/or replication target disks 140 and executes transfer of the data to server system 112. Further, CRP 125 retains data as block storage during transfer of data to server system 112 to ensure data can be accessible by CRP 125 with access to user interface 155. In various embodiments, CRP 125 can execute conversion of data in object storage to block storage during transfer of data from server system 114 and/or replication target disks 140 to server system 112.

In various embodiments, replication target disks 140 executes transfer of data from replication target disks 140 and/or server system 114 to server system 112. Further, replication target disks 140 retains data as block storage during transfer of data to server system 112 to ensure data can be accessible by CRP 125 with access to user interface 155. In various embodiments, replication target disks 140 can execute conversion of data in object storage to block storage during transfer of data from replication target disks 140 to server system 112.

Figure 5:
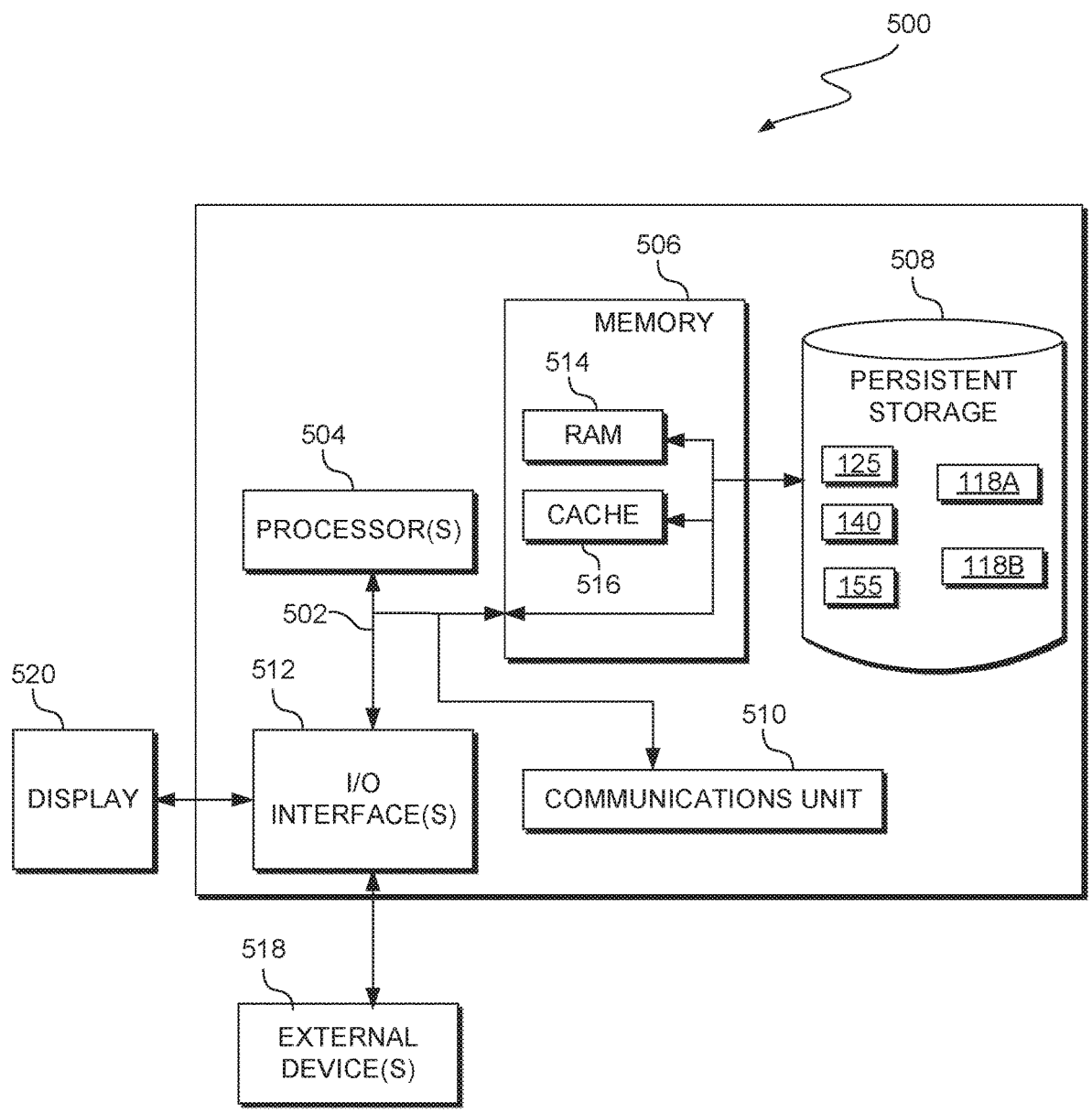
FIG. 5 a block diagram of components of one or more computing devices within the computing environment depicted in FIG. 1, in accordance with at least one embodiment of the present invention.

FIG. 5 depicts a block diagram, 500, of components of SDN environment 100, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

SDN Environment 100 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

CRP 125, replication target disks 140, user interface 155, database 118A and database 118B are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. CRP 125, replication target disks 140, user interface 155, database 118A and database 118B may be downloaded to persistent storage 308 through communications unit 510.

I/O interface(s) 512 allows for input and output of data with other devices that may be connected to SDN environment 100. For example, I/O interface(s) 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., CRP 125, replication target disks 140, user interface 155, database 118A and database 118B, can be stored on such portable computer-readable storage media and can be loaded onto persistent storage 508 via I/O interface(s) 512. I/O interface(s) 512 also connect to a display 520.

Display 520 provides a mechanism to display data to systems and/or software and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
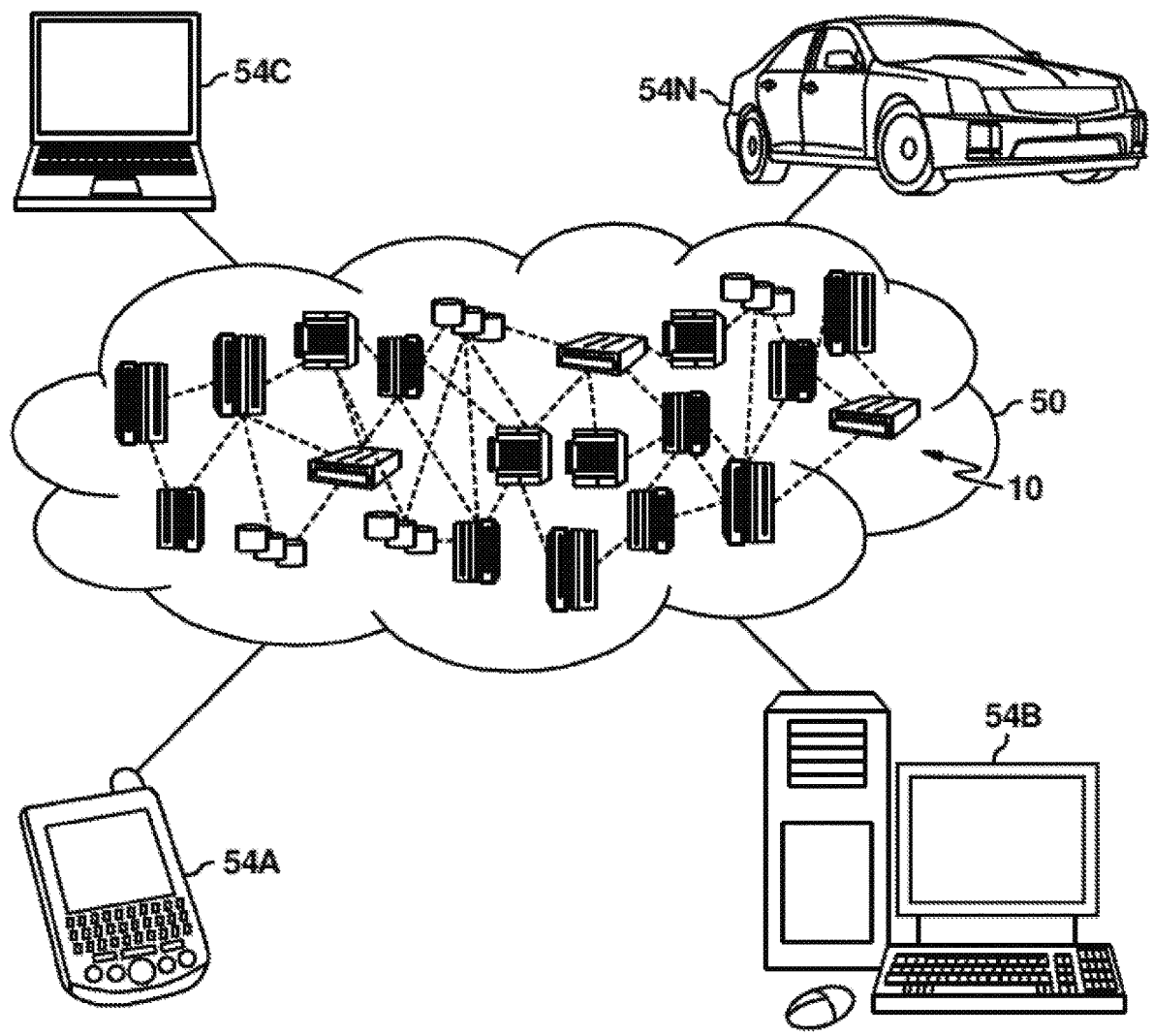
FIG. 6 depicts a cloud computing environment according to at least one embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
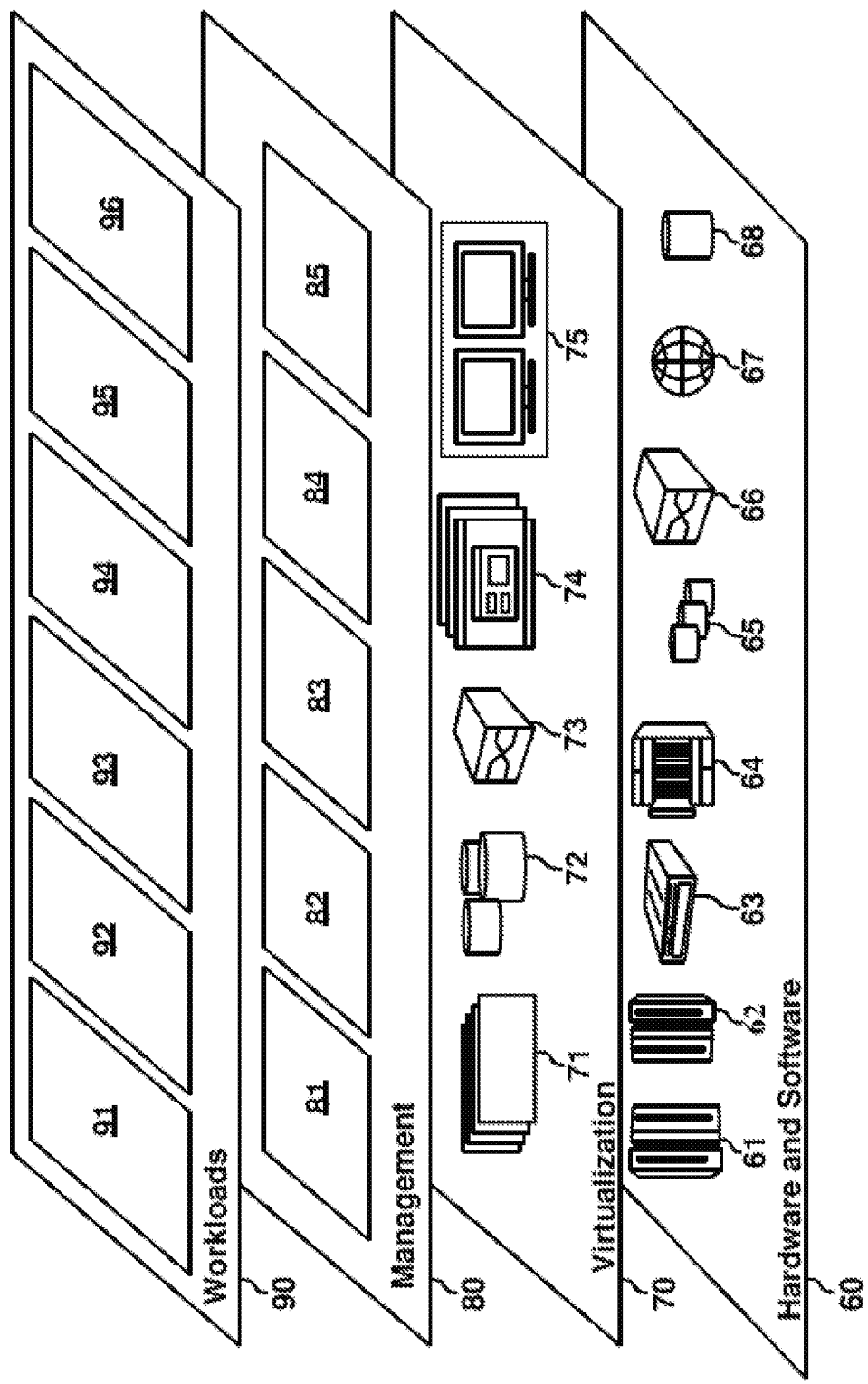
FIG. 7 depicts abstraction model layers according to at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method of disaster recovery protocol for a virtual storage system, the method comprising:
   generating, by one or more processors, a set of data that describes respective access rates of cache entries of a primary virtual storage system;
   generating, by one or more processors, a data record that is associated with a secondary virtual storage system and indicates (i) a first storage device that includes block storage and (ii) a second storage device that includes object storage; and
   responsive to either (i) a failover of the primary virtual storage system or (ii) a migration request for the primary virtual storage system, populating, by the one or more processors, the first storage device and the second storage device based, at least in part, on respective rates of access of the cache entries of the primary virtual storage system, wherein data stored as block storage entries in the first storage device are predicted to have a higher rate of access when compared to predicted rates of access for data stored as object storage entries in the second storage device.

2. The method of claim 1, the method further comprising:
   generating, by the one or more processors, a first data partition in the first storage device that includes a set of block data records that correspond to data entries stored in the cache entries of the primary virtual storage system that are predicted to have at least a threshold rate of access; and
   generating, by the one or more processors, a second data partition in the second storage device that includes a set of object data records that correspond to a data stored in the cache entries of the primary virtual storage system that are predicted to have less than the threshold rate of access.

3. The method of claim 1, the method further comprising:
   generating, by one or more processors, a data that (i) is associated with a primary virtual storage system and a secondary virtual storage system, and (ii) includes a data record; and
   storing, by the one or more processors, the data as (i) a first data partition that includes the data record, identifying, at least, a first object data associated with the data in the first storage device and (ii) a second data partition that includes the data record, identifying, at least, a second object data associated with the data in the second storage device.

4. The method of claim 1, the method further comprising:
   determining, by one or more processors, the failover of the primary virtual storage system has occurred based on a determination that the secondary virtual storage system has received receipt of the failover from a cache replication program.

5. The method of claim 4, the method further comprising:
   responsive to a failover of the primary virtual storage system, assigning, by the one or more processors, the secondary virtual storage system to provision storage capacity to a target disk associated with (i) the first storage device of the block storage and (ii) the secondary virtual storage system.

6. The method of claim 4, the method further comprising:
   executing, by the one or more processors, conversion of a data based, at least, on (i) a first data partition and (ii) the data record; and
   storing, by the one or more processors, the data based, at least, on the (i) the first data partition and (ii) the data record.

7. The method of claim 1, the method further comprising:
   authorizing, by the one or more processors, transfer of (i) a first data partition and (ii) a second data partition based on receipt of a reconstructed primary virtual storage system; and
   deprovisioning, by the one or more processors, a target disk associated with (i) the cache of the block storage and (ii) the secondary virtual storage system.

8. The method of claim 1, the method further comprising:
   determining, by the one or more processors, a first data that is (i) associated with a replication and (ii) a data record, and a second data that is (i) associated with a host and (ii) a data record;
   storing, by the one or more processors, the first data as a data object based, at least, on the (i) the second storage device and the (ii) data record; and
   storing, by the one or more processors, the second data as a data block based, at least, on the (i) the first storage device and (ii) the data record.

9. A computer program product for disaster recovery protocol for a virtual storage system, the computer program product comprising:
   one or more computer-readable storage media and program instructions stored on the one or more computer-readable storage media, the program instructions comprising:

program instructions to generate a set of data that describes respective access rates of cache entries of a primary virtual storage system;

program instructions to generate a data record that is associated with a secondary virtual storage system and indicates (i) a first storage device that includes block storage and (ii) a second storage device that includes object storage; and program instructions to respond to either (i) a failover of the primary virtual server or (ii) a migration request for the primary virtual server by populating the first storage system and the second storage system based, at least in part, on respective rates of access of cache entries of the primary virtual server, wherein data stored as block storage entries in the first storage device are predicted to have a higher rate of access when compared to predicted rates of access for data stored as object storage entries in the second storage system.

10. The computer program product of claim 9, the program instructions further comprising:

program instructions to generate a first data partition in the first storage device that includes a set of block data records that correspond to data entries stored in the cache entries of the primary virtual storage system that are predicted to have at least a threshold rate of access; and program instructions to generate a second data partition in the second storage device that includes a set of object data records that correspond to a data stored in the cache entries of the primary virtual storage system that are predicted to have less than the threshold rate of access.

11. The computer program product of claim 9, the program instructions further comprising:

program instructions to generate a data that (i) is associated with a primary virtual storage system and a secondary virtual storage system, and (ii) includes a data record; and program instructions to store the data as (i) a first data partition that includes the data record, identifying, at least, a first object data associated with the data in the first storage device and (ii) a second data partition that includes the data record, identifying, at least, a second object data associated with the data in the second storage device.

12. The computer program product of claim 9, the program instructions further comprising:

program instructions to determine the failover of the primary virtual storage system has occurred based on a determination that the secondary virtual storage system has received receipt of the failover from a cache replication program.

13. The computer program product of claim 12, the program instructions further comprising:

responsive to a failover of the primary virtual storage system assigning the secondary virtual storage system, program instructions to provision storage capacity to a target disk associated with (i) the first storage device of the block storage and (ii) the secondary virtual storage system.

14. The computer program product of claim 12, the program instructions further comprising:

program instructions to execute conversion of a data based, at least, on (i) a first data partition and (ii) the data record; and program instructions to store the data based, at least, on the (i) the first data partition and (ii) the data record.

15. The computer program product of claim 9, the program instructions further comprising:

program instructions to authorize a transfer of (i) a first data partition and (ii) a second data partition based on receipt of a reconstructed primary virtual server; and program instructions to deprovision of a target disk associated with (i) the cache of the block storage and (ii) the secondary virtual server.

16. The computer program product of claim 9, the program instructions further comprising:

program instructions to determine a first data that is (i) associated with a replication and (ii) a data record, and a second data that is (i) associated with a host and (ii) a data record;

program instructions to store the first data as a data object based, at least, on the (i) the second storage device and the (ii) data record; and program instructions to store the second data as a data block based, at least, on the (i) the first storage device and (ii) the data record.

17. A computer system for disaster recovery protocol for a virtual storage system, the computer system comprising:

one or more computer processors;

one or more computer readable storage medium; and program instructions stored on the computer readable storage medium for execution by at least one of the one or more processors, the program instructions comprising:

program instructions to generate a set of data that describes respective access rates of cache entries of a primary virtual storage system;

program instructions to generate a data record that is associated with a secondary virtual storage system and indicates (i) a first storage device that includes block storage and (ii) a second storage device that includes object storage; and program instructions to respond to either (i) a failover of the primary virtual storage system or (ii) a migration request for the primary virtual storage system by populating the first storage device and the second storage device based, at least in part, on respective rates of access of the cache entries of the primary virtual storage system, wherein data stored as block storage entries in the first storage device are predicted to have a higher rate of access when compared to predicted rates of access for data stored as object storage entries in the second storage device.

18. The computer system of claim 17, the program instruction further comprising:

program instructions to generate a first data partition in the first storage device that includes a set of block data records that correspond to data entries stored in the cache entries of the primary virtual storage system that are predicted to have at least a threshold rate of access; and program instructions to generate a second data partition in the second storage device that includes a set of object data records that correspond to a data stored in the cache entries of the primary virtual storage system that are predicted to have less than the threshold rate of access.

19. The computer system of claim 17, the program instruction further comprising:

responsive to a failover of the primary virtual storage system, assigning the secondary virtual storage system, the program instructions to provision storage capacity to a target disk associated with (i) the first storage device of the block storage and (ii) the secondary virtual storage system.

20. The computer system of claim 17, the program instruction further comprising:
program instructions to execute conversion of a data based, at least, on (i) a first data partition and (ii) the data record; and
program instructions to store the data based, at least, on the (i) the first data partition and (ii) the data record.

\* \* \* \* \*